UNITED STATES PATENT OFFICE.

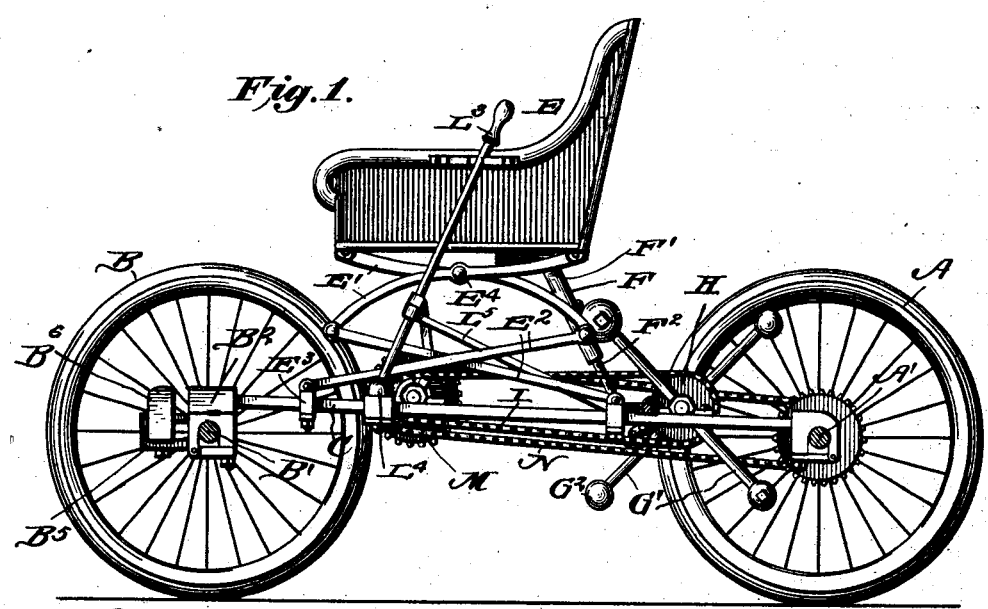

FREDERIC DUQUEMIN, OF FALL RIVER, MASSACHUSETTS.

VEHICLE PROPULSION MECHANISM.

SPECIFICATION forming part of Letters Patent No. 693,956, dated February 25, 1902.

Application filed June 1, 1901. Serial No. 62,722. (No model.)

*To all whom it may concern:*

Be it known that I, FREDERIC DUQUEMIN, a citizen of the United States, residing at Fall River, in the county of Bristol and State of Massachusetts, have invented a new and useful Vehicle Propulsion Mechanism, of which the following is a specification.

This invention relates generally to vehicles, and more particularly to improved means for propelling the same.

The object of the invention is to provide a simple construction whereby the oscillation or rocking of the passenger-seat will operate the propelling mechanism.

Another object of the invention is to provide for throwing the propelling mechanism into or out of operation; and a still further object is to provide for braking the vehicle simultaneously with throwing the mechanism out of gear.

With these and other objects which appear hereinafter the invention consists in the peculiar construction of the various parts and in their novel combination or arrangement, all of which will be fully described hereinafter and pointed out in the claims.

In the drawings forming part of this specification, Figure 1 is a sectional elevation taken on the line 1 1 of Fig. 2 looking in the direction of the arrow. Fig. 2 is a sectional plan view, the direction being the reverse to that shown in Fig. 1.

In carrying out my invention I employ the rear wheels A, connected to the axle A', and the front wheels B, connected to the axle B'. The side beams C and central beams D are connected at their rear ends to the rear axle A' and at their forward ends are connected to a bolster $B^2$, which is pivotally connected to the axle B' by means of the king-bolt $B^3$. The forward axle has a forwardly-projecting axle $B^4$, to which is rigidly attached a steering-bar $B^5$, having stirrups $B^6$ at its opposite end to receive the feet of the operator.

E represents the seat, which is supported at each side by a pair of rocker-arms E', the upper ends of said arms being pivotally attached to the bottom of the seat, the lower ends of said arms being pivotally connected to the upper ends of the cross-bars $E^2$, the lower ends of said cross-bars being pivotally connected to clips $E^3$, which are securely fastened to the side beams C at suitable points. The rocker-arms E' are pivotally connected at $E^4$; but the cross-bars $E^2$ are not pivotally connected together, but work past each other with a sliding movement. A pitman F is attached to the bottom of the seat E, at the rear thereof, said pitman being connected at its lower end to a crank-shaft G, said crank-shaft being journaled upon the central beams D adjacent to their rear ends, and has one or more balance-arms G' mounted upon its ends, said arms having weights or balls $G^2$ arranged upon their outer ends, one ball $G^3$ being larger and heavier than the others to overcome dead-centers. The pitman F is preferably formed of two sections, the upper section F' being tubular and the lower one $F^2$ being solid and telescoping into the tubular one, said sections being held in their adjusted positions by means of a locking-pin $F^3$. A sprocket-wheel H is mounted upon the crank-shaft G and operates a chain I, which engages a sprocket K, mounted upon a shaft L, journaled upon the central beams D adjacent to their forward ends. This shaft L also has a sprocket-wheel M mounted thereon, which engages a drive-chain N, which operates the sprocket O, rigidly mounted upon the rear axle A', and inasmuch as the rear wheels A are rigidly mounted upon the rear axle it will be readily seen that by rocking or oscillating the seat the pitman operates the crank-shaft, and this in turn operates the counter-shaft, and the counter-shaft rotates the rear axle by means of the sprocket and drive-chain, and the vehicle is propelled forwardly. In practice I prefer to make the sprocket M a multiple sprocket, and likewise the sprocket O, so that by shifting the chain N the speed of the vehicle can be varied as desired. The sprocket-wheel K is preferably mounted loosely upon the shaft L, and in order to connect it with the said shaft I employ a clutch L', operated by means of a rod $L^2$, which rod is connected to a lever $L^3$, pivotally connected at its lower end by means of a ball-and-socket joint $L^4$. The lever $L^3$ also has a rod $L^5$ attached thereto, which rod is pivotally connected to the brake-lever $L^6$, so that when the hand-lever $L^3$ is operated to throw the clutch L' into engagement with the sprocket the brake is removed from the rear wheel; but when the hand-lever is operated so as to irow the clutch out of engagement and disconnect the driving mechanism the brake-lever is then applied, thereby serving to stop the motion of the vehicle. As before stated, the feet of the operator rest in the stirrups $B^6$, and by means of which the vehicle is steered, and in order to accommodate persons of different sizes the clips $E^3$ are adjustable upon the side beams, thereby raising or lowering the position of the seat, and the pitman is also adjusted at the same time.

In operation the operator sits in the seat E and places his feet in the stirrups $B^6$. The entire weight of the body is then thrown upon the back of the seat, thereby forcing the pitman downwardly and operating the crank-shaft. This starts the operating mechanism, and by continuing to rock or oscillate the seat the vehicle can be rapidly propelled in a forward direction.

Having thus fully described my invention, what I claim as new, and desire to secure by Letters Patent, is—

1. In a device of the kind described, the combination with the supporting-frame, of the oscillating seat, the rocking arms attached to the said seat and pivotally connected to each other, the cross-arms pivotally connected at their upper ends to the rocker-arms and adjustably connected at their lower ends to the supporting-frame, the adjustable pitman, the crank-shaft and means for transmitting motion of the crank-shaft to the rear axle, substantially as described.

2. In a device of the kind described, the combination with a driving mechanism, including the shaft L and a clutch-section arranged thereon, sprockets K and M mounted thereon, one of which is normally loose and adapted to be clutched to the shaft, of the brake-lever, the hand-lever and rods for connecting the clutch and brake-lever with the hand-lever, substantially as shown and described.

FREDERIC DUQUEMIN.

Witnesses:
JOHN COX,
FRANCK COME.